United States Patent [19]

Asher et al.

[11] Patent Number: 4,968,084
[45] Date of Patent: Nov. 6, 1990

[54] AUTOMOTIVE PICKUP TRUCK TAILGATE RETROFIT APPARATUS

[76] Inventors: John R. Asher; Georgette C. Asher, both of 5552 Cedarwood Dr., Sarasota, Fla. 34232

[21] Appl. No.: 448,695

[22] Filed: Dec. 11, 1989

[51] Int. Cl.⁵ ............................................. B62D 25/00
[52] U.S. Cl. .................................. 296/50; 296/57.1; 280/770
[58] Field of Search ............... 296/50, 57.1, 61, 62, 296/1.1; 280/770

[56] References Cited

U.S. PATENT DOCUMENTS 3,709,770  1/1973  Hall ..................................... 296/901
4,181,349  1/1980  Nix et al. ............................. 296/50
4,892,348  1/1990  Nozaki ................................ 296/146

Primary Examiner—Robert R. Song
Attorney, Agent, or Firm—Charles J. Prescott

[57] ABSTRACT

An automotive pickup retrofit apparatus including a formed strip of thin, rigid material structured for close matable connection protectively and decoratively covering a portion of the rear contoured panel of the tailgate. One embodiment includes a formed, elongated sheet of thin, rigid material forming a protective and decorative outer layer structured for close matable connection over substantially the entire front or rear panel of the tailgate. An open or bottomed frame structured for connection within an aperture formed through the central portion of the tailgate is also provided which may include further protective ornamentation.

8 Claims, 3 Drawing Sheets

AUTOMOTIVE PICKUP TRUCK TAILGATE RETROFIT APPARATUS

BACKGROUND OF THE INVENTION

This invention relates generally to exterior protective and decorative structure for vehicles, and more particularly to a pickup tailgate retrofit apparatus connectable onto the exposed front or rear surface of the tailgate.

Tailgates for pickup trucks experience a considerable amount of abuse during the lifetime of the pickup truck. This abuse is in the form of either shifting loads within the bed of the pickup truck, weather and road debris exposure and/or impact to the rear surface of the tailgate during loading and unloading and positioning of the vehicle. These tailgates are thus subjected to considerable amount of denting and deformation and accelerated rust and pitting of the paint and underlying metal structure.

Separately, the tailgate of a pickup truck is notoriously unattractive if viewed from the rear of the pickup truck and also creates a considerable amount of wind drag when in its closed, upright position while the vehicle is underway.

The present invention provides an easily manufacturable and installable protective and decorative retrofit apparatus to be structured for connection over all or a portion of either the front or rear exposed surface of the tailgate to both cover preexisting damage and rust which has already occurred and also to prevent further such damage and corrosion. Additionally, in one embodiment, the wind resistance caused by the tailgate in its upright position is substantially reduced. All embodiments are also intended to substantially enhance the aesthetic appeal of the tailgate.

BRIEF SUMMARY OF THE INVENTION

This invention is directed to an automotive pickup retrofit apparatus including a formed strip of thin, rigid material structured for close matable connection protectively and decoratively covering a portion of the rear contoured panel of the tailgate. One embodiment includes a formed, elongated sheet of thin, rigid material forming a protective and decorative outer layer structured for close matable connection over substantially the entire front or rear panel of the tailgate. An open or bottomed frame structured for connection within an aperture formed through the central portion of the tailgate is also provided which may include further protective ornamentation.

It is therefore an object of this invention to provide a retrofit apparatus connectable to either front or rear exposed surfaces of the tailgate of a pickup truck so as to protectively and decoratively enhance that tailgate structure.

It is another object of this invention to provide a wide variety of retrofit apparatus for protective and decorative enhancement of pickup truck tailgates.

It is yet another object of this invention to substantially reduce the wind resistance resulting from the tailgate of a pickup truck in its upright position while the vehicle is underway.

In accordance with these and other objects which will become apparent hereinafter, the instant invention will now be described with reference to the accompanying drawings.

DETAILED DESCRIPTION OF THE INVENTION

Figure 1:
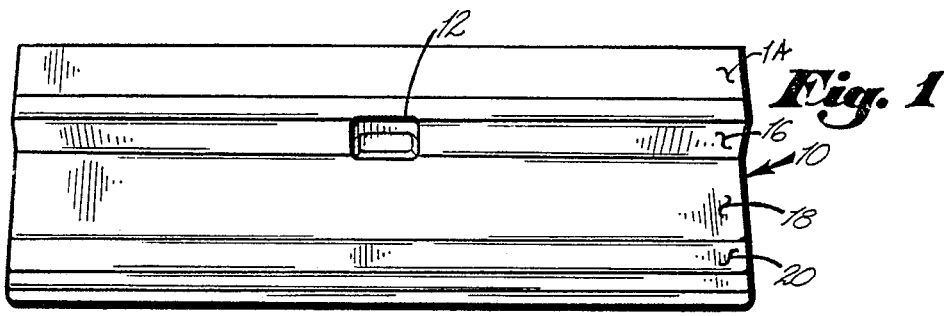
FIG. 1 is a rear elevation view of one style of a conventional pickup tailgate.
Figure 6:
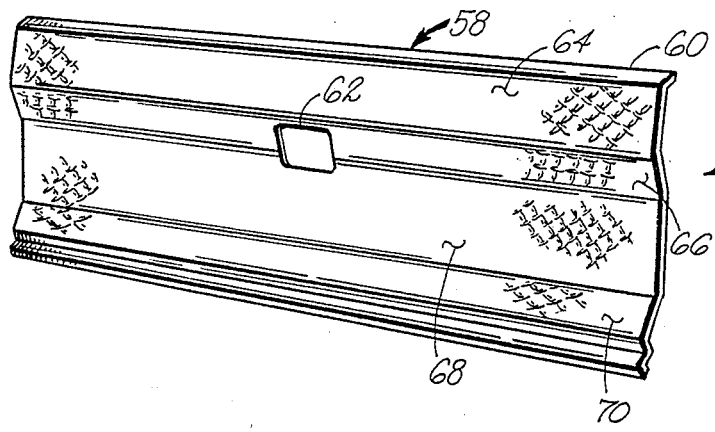
FIG. 6 is a rear perspective view of yet another embodiment of the invention ready for connection onto the rear panel of a Chevrolet S-10 pickup truck tailgate (not shown).

Referring now to the drawings, and particularly to FIGS. 1 and 6, one form of a typical pickup truck rear tailgate as shown generally at numeral 10. This tailgate is formed having generally uniform transverse folds which create flat panels shown typically at 14, 16, 18, and 20. These folds are formed into the sheet metal of the tailgate 10 as desired by designer for both strength and styling. Typically a door latch 12 is disposed in the mid portion of the tailgate 10. One embodiment of the invention is shown in FIG. 6 generally at numeral 58 fabricated of rigid sheet metal stock having an exposed decorative diamond pattern known as diamond plate. This diamond plate is typically found in sheet stock utilized for non-skid scaffolding or industrial walkways, steps, and the like. One-eighth inch thick polished aluminum diamond plate stock is preferred. This device 58 includes formed sections 64, 66, 68 and 70 which generally closely mate and align against surfaces 14, 16, 18, and 20 of tailgate 10. Aperture 62 is also formed into the device 58 so as to provide a clearance access to door latch 12 of the tailgate 10. Upper lip 60 is also provided which surrounds the upper margin of tailgate 10 so that this embodiment 58 completely protects the rear and upper exposed surfaces of tailgate 10.

Attachment of retrofit device 58 to and against the rear exposed surface of tailgate 10 is accomplished by conventional fasteners or adhesive means. Thus, a considerably more durable and decorative exposed rear surface for tailgate 10 is provided, while also completely concealing any previous damage or deterioration which may have occurred in tailgate 10 during use, because the invention in all embodiments is intended to be primarily a retrofit apparatus for use and installation by owners of pickup trucks.

Figure 2:
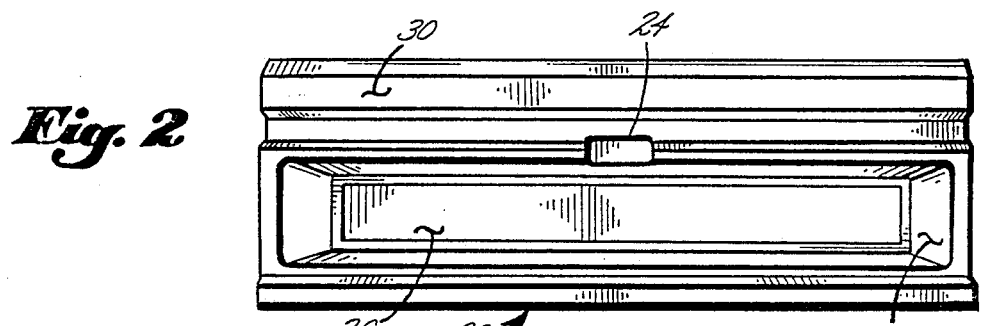
FIG. 2 is a rear elevation view of another style of a conventional pickup tailgate.

Referring now to FIG. 2, another form of a conventional tailgate is shown generally at 22. The non-uniform rear surface of this tailgate 22 includes a central dished area having inwardly disposed or tapered side surfaces 28 surrounding a flattened, raised central surface 26 for styling and rigidity. This tailgate 22 also includes a door latch 24 which is positioned below a upper panel portion 30 provided for rigidity and may also serve for reinforcement against impact. As will be shown herebelow, the primary concern with regard to protection of such features in this style of tailgate 22 is the upper horizontal margin of the tailgate 22, the entire portions of, and/or the entire dished area including tapered side walls 28 and raised central area 26, as well as the upper panel portion 30.

Figure 3:
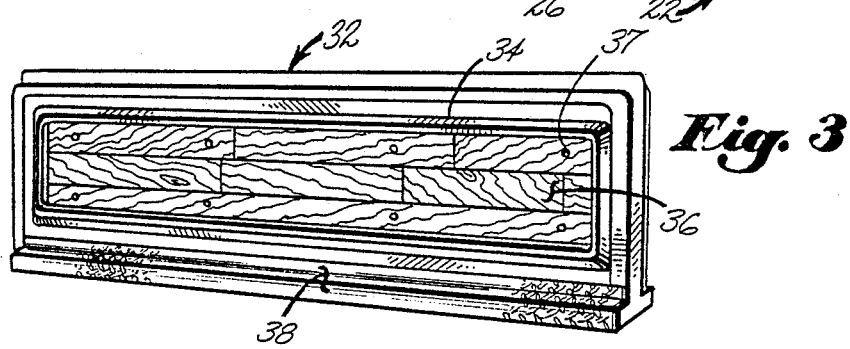
FIG. 3 is a rear perspective view of one embodiment of the invention connected onto the rear surface of a pickup truck tailgate.

Referring now to FIG. 3, another variation of a pickup truck tailgate is shown generally at 32 which includes a central dished area atop which decorative and protective panel 36 has been connected by conventional fasteners 37. A molded, plastic perimeter frame 34 fitted around panel 36 provides further protection and an enhanced finished appearance. An additional formed rigid panel 38 fabricated of diamond plate sheet material is provided to cover the lower margin area primarily for protection in newer tailgates 32 and particularly useful in covering rusted and dented areas of older such tailgates.

Figure 4:
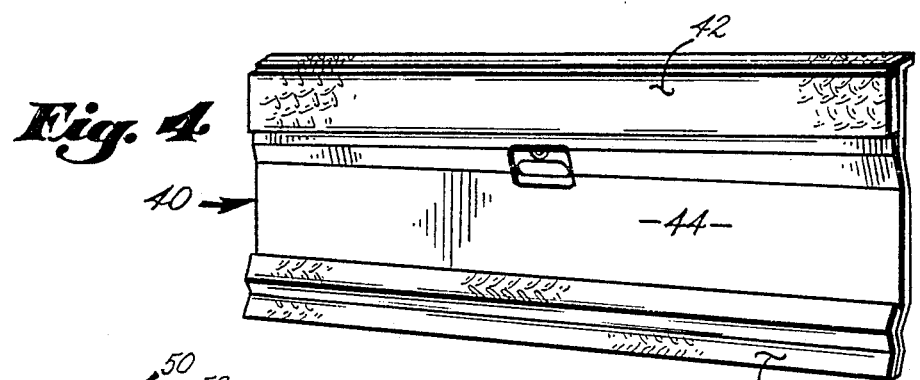
FIG. 4 is a front perspective view of another embodiment of the invention connected atop the front panel of the tailgate shown in FIG. 1.

Referring now to FIG. 4, the rear panel of another tailgate is there shown generally at numeral 40 having longitudinal uniform fold feature lines similar to that shown in FIG. 1. The embodiment of the invention here shown includes two separate panels 42 and 46 which are fabricated of diamond plate material of approximately ⅛″ thickness and formed to closely mate and fit over the respective upper and lower portions of rear panel 40 as shown. Again, both panels 42 and 46 provide both protection and decorative accent features for these highly abused portions of the rear panel 40 of this tailgate. Central rear panel surface 44 is left uncovered.

Figure 5:
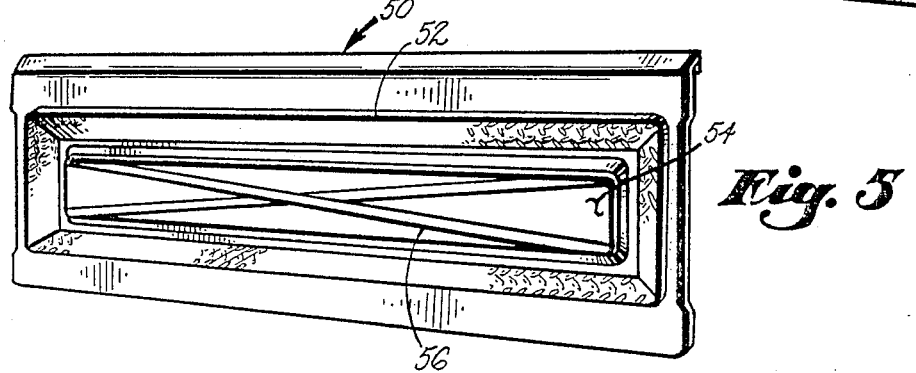
FIG. 5 is a rear perspective view of yet another embodiment of the invention connected onto the rear panel of a Ford pickup truck tailgate.

Referring now to FIG. 5, another conventional tailgate is there shown at numeral 50. This tailgate 50 also includes a central dished area similar to that previously described in FIG. 2 and this embodiment of the invention includes a tapered perimeter frame 52 fabricated of diamond plate sheet material secured atop the mating surface of tailgate 50 therebeneath. This embodiment of the invention in FIG. 5 also includes a central decorative panel 54 having crossed reflective accent strips 56 attached thereto so as to protect the raised central area of the tailgate 50.

Referring now to FIG. 6, another embodiment of the invention is shown generally at numeral 58. This embodiment 58 is structured to closely mate and align against and be connected to the entire rear surface of the tailgate 10 as shown in FIG. 1. This embodiment 58 is fabricated of the rigid diamond plate material fabricated to have panel sections 60, 64, 66, 68, and 70 with the diamond pattern rearwardly exposed. These panel sections 60, 64, 66, 68 and 70 cover the upper margin and substantially the entire rear surface of tailgate 10 for full protection, concealment of previous damage, and decoration. Aperture 62 is also provided to accommodate clearance to tailgate door latch 12.

Referring now to FIGS. 7, 8, 9 and 10, a more current design of a conventional tailgate for smaller pickup trucks is shown generally at numeral 72. This tailgate 72 includes a plurality of longitudinal rear panel portions having a generally uniform cross section across the entire length of the tailgate 72. Hinges 78 provide the interconnection to the bed structure of the pickup truck.

Figure 7:
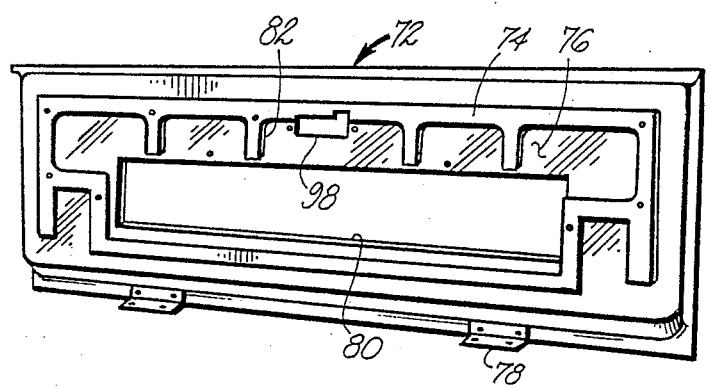
FIG. 7 is a front perspective view of the front surface of a Toyota pickup truck tailgate having an aperture formed therethrough ready to receive yet another embodiment of the invention.

Although various of the previously described embodiments of the invention may be adapted for use in conjunction with this tailgate 72, the embodiments of the invention described herebelow are in conjunction with an aperture 80 which has been formed into the mid portion of the rear panel 76 of tailgate 72. In conjunction with forming this aperture 80, a portion of the stiffening ribs 82 have also been cut and eliminated for full clearance entirely through the tailgate 72 as shown in FIG. 7.

Figure 8:
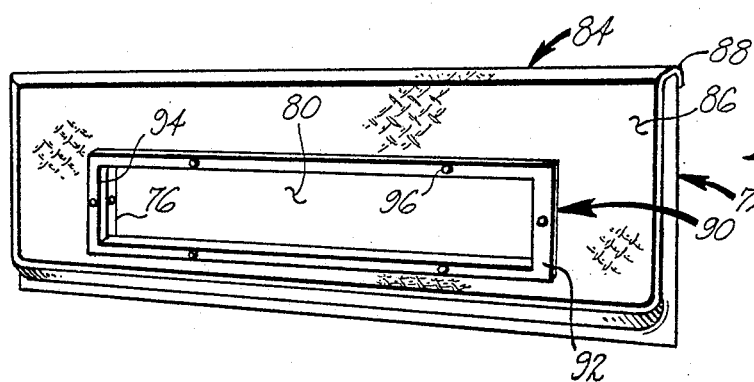
FIG. 8 is a front perspective view similar to FIG. 7 and including another embodiment of the invention in position ready for connection onto the modified front panel of the tailgate.
Figure 9:
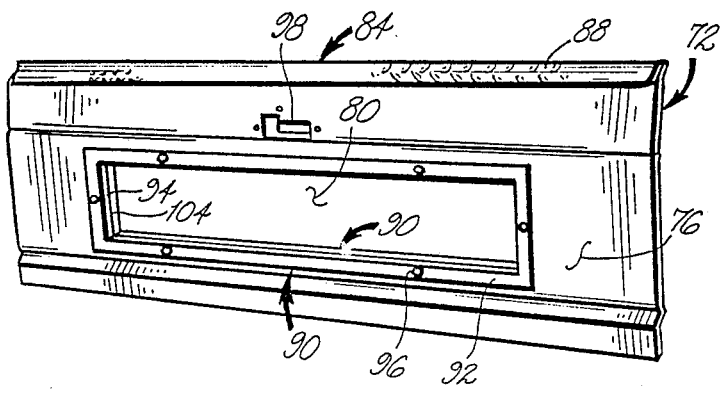
FIG. 9 is a rear perspective view of FIG. 8 showing both frame halves assembled in position.
Figure 10:
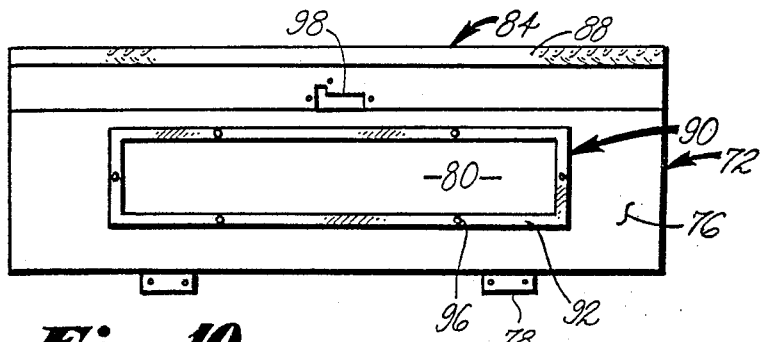
FIG. 10 is a rear elevation view of FIG. 9.

Referring particularly to FIGS. 8, 9 and 10, one portion of this embodiment of the invention is shown generally at numeral 84 fabricated of a contoured sheet of diamond plate stock material and having a main panel portion 86 which is sized and configured so as to cover substantially the entire forwardly facing surface 74 of tailgate 72. This formed panel 84 also includes upper contoured section 88 which is structured so as to wrap around the upper margin of tailgate 72 and to extend slightly downwardly on the rearwardly panel 76 of tailgate 72 as best seen in FIGS. 9 and 10. Attachment of this contoured panel 84 is by conventional fastening means.

Contoured panel 84 also includes an aperture of a similar shape and alignment to aperture 80, formed in tailgate 72 so as to matably receive frame or window 90. Frame 90 includes a side wall portion 94 around the entire inner perimeter of the window formed by frame 90 and outwardly extending flange 92. Apertures 96 are provided for connection of the frame 90 to the tailgate 72 as will be herebelow described with respect to FIGS. 11 and 14.

One frame 90 is fitted into aperture 80 and against contoured panel 84; another frame 90, as best seen in FIGS. 9 and 10, is fitted into aperture 80 from the other direction whereby flange 92 closely mates against rear panel 76 of tailgate 72 adjacent the aperture 80. These two frames 90 include sidewalls 94 which are sized so as to abut one another along 104 as shown in FIGS. 9 and 11 to eliminate gaps at that point.

Figure 11:
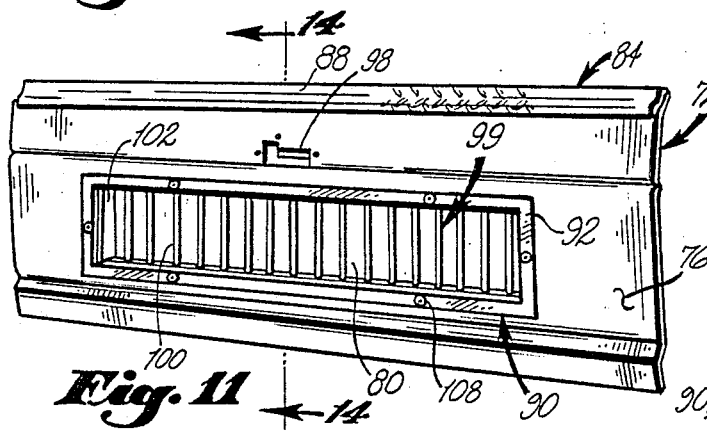
FIG. 11 is a rear perspective view of the embodiment of the invention shown in FIG. 9 having an additional window insert.
Figure 14:
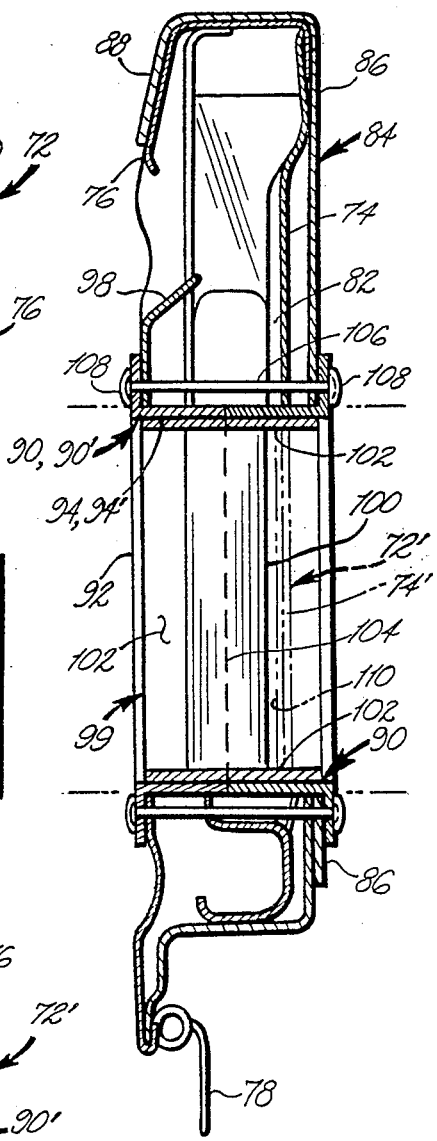
FIG. 14 is a section view in the direction of arrows 14—14 in FIG. 11.

Referring additionally to FIGS. 11 and 14, the embodiment of the invention there shown is in conjunction with the tailgate 72 as previously described in FIG. 7 and includes contoured panel 84 and two mating frames 90 each installed from the front and rear sides of tailgate 72 into prepared aperture 80. This embodiment of the invention further includes window insert 99 having the separate perimeter 102 and a plurality of upright spaced bars 100 disposed therewithin. This perimeter 102 is sized to slidably fit within mating frames 90 and to be connected by conventional fastening means therewithin.

It is here noted with respect to all embodiments of the invention having an aperture formed into the tailgate that a substantial benefit is derived by the elimination of a portion of the wind resistance created by the tailgate in its upright, closed position while the vehicle is underway. The embodiments in the invention in conjunction with this formed tailgate aperture allow air to circulate and pass more freely through the tailgate while the embodiments shown in FIGS. 11 and 14 still confines objects placed within the bed of the pickup truck from falling out of the aperture while the vehicle is under way.

Figure 12:
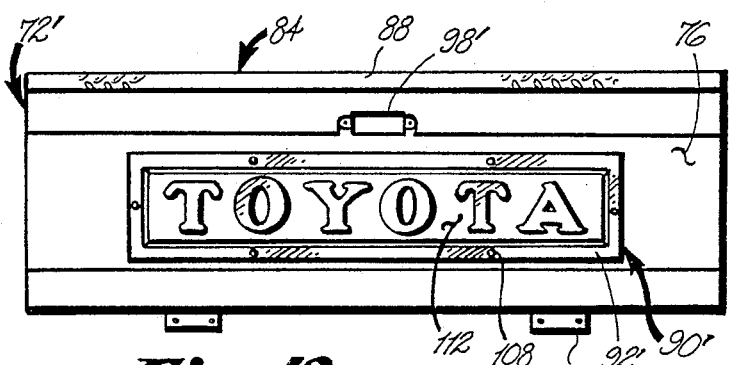
FIG. 12 is a rear elevation view of another embodiment of the invention connected into an aperture formed only into the rear panel of a Toyota pickup truck tailgate.
Figure 13:
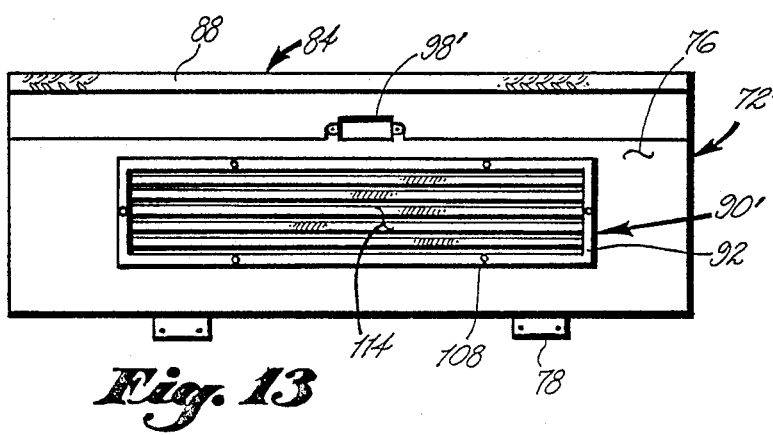
FIG. 13 is a rear elevation view of another embodiment of FIG. 12.

Referring lastly to FIGS. 12 and 13, a variation of the above described invention with respect to FIGS. 7 to 11 and 14 is there shown. This embodiment includes modifying tailgate 72' by only cutting aperture 80 through the rear panel of 76 of the tailgate. The front panel 74 is left intact as shown in phantom at 74'. Frame 90' includes flanges 92 which mate against the rear surface 76 of tailgate 72'. However, extended side walls 94' as seen in FIG. 14 extend forwardly within aperture 80 all the way to and against the inner surface of front panel 74' as shown in phantom. Additionally, a bottom plate 110 shown in phantom in FIG. 14 is also provides so as to provide a fully finished appearance within frame 90'. Obviously a similar frame 90' from and against the front panel 74 of the tailgate 72' is not required.

Connected atop the rearwardly facing surface of bottom plate 110 is viewable decorative indicia such as the vehicle manufacturer's name shown in FIG. 12 or a plurality of horizontal reflective strips 114 as shown in FIG. 12. Other embodiments of this decorative addition to bottom plate 110 may be provided.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. An automotive pickup truck tailgate retrofit apparatus the tailgate having exposed front and rear panels, comprising:
    a contoured elongated strip of thin, rigid material forming a protective and decorative cover structured for close, matable connection atop and covering one contoured portion of the rear panel of the tailgate, wherein the tailgate includes a central dished area having tapered side surfaces extending around a flattened central surface, said apparatus further comprising:
    a plurality of generally flat lengths of thin, rigid sheet material connected at their abutting corners to form a protective perimeter structured for close matable connection atop and covering the tapered surfaces of the dished area of the tailgate.

2. An automotive pickup truck tailgate retrofit apparatus as set forth in claim 1, further comprising:
    a generally flat, thin central sheet of rigid material connectable for protection and decoration atop the central surface of the dished area of the tailgate.

3. An automotive pickup truck tailgate retrofit apparatus the tailgate having exposed front and rear panels, comprising:
    a contoured, elongated sheet of thin, rigid material forming a protective and decorative outer layer structured for close, matable connection atop and covering substantially the entire front panel of the tailgate, further comprising:
        an open frame connectable within an aperture formed through the central portion of the front and rear panels of the tailgate and said outer layer;
        said frame including front and rear frame portions each having a main body portion and an outwardly extending flange;
        said main body portions abutting one to another at a mid point within the aperture when said flanges are positioned against the front and rear panels, respectively, adjacent the aperture to form a continuous window through the tailgate.

4. An automotive pickup truck tailgate retrofit apparatus as set forth in claim 3, further comprising:
    a window insert sized to slidably fit and be securable within said window;
    said window insert including a plurality of spaced, parallel bars.

5. An automotive pickup truck tailgate retrofit apparatus, the tailgate having front and rear panels forming the exterior of the tailgate, comprising:
    a open frame connectable within an aperture formed through the central portion of the front and rear panels of the tailgate and said outer layer;
    said frame including front and rear frame portions each having a main body portion and an outwardly extending flange;
    said main body portions abutting one to another at a mid point within the aperture when said flanges are positioned against the front and rear panels, respectively, adjacent the aperture to form a continuous window through the tailgate.

6. An automotive pickup truck tailgate retrofit apparatus as set forth in claim 5, further comprising:
    a window insert sized to slidably fit and be securable within said window;
    said window insert including a plurality of spaced, parallel bars.

7. An automotive pickup truck tailgate retrofit apparatus, the tailgate having front and rear panels forming the exterior of the tailgate, comprising:
    a frame having side walls and a bottom connectable within an aperture formed through the central portion of the rear panel of the tailgate;
    said frame also having a flange outwardly extending from said side walls;
    said side walls extending through the aperture from the rear panel to the front panel whereby said bottom is positioned adjacent the inner surface of the front panel when said flange is against the rear panel adjacent the aperture.

8. An automotive pickup truck tailgate retrofit apparatus as set forth in claim 7, further comprising:
    decorative indicia connected to said bottom viewable from the rear of the vehicle.

* * * * *